United States Patent [19]

Nakane et al.

[11] Patent Number: 5,034,440

[45] Date of Patent: Jul. 23, 1991

[54] POLYESTER COMPOSITION-COVERED WIRE

[75] Inventors: Toshio Nakane, Fuji; Yukihiko Kageyama, Fujinomiya; Hiroaki Konuma, Shimizu; Kenji Hijikata, Mishima, all of Japan

[73] Assignee: Polyplastics Co., Ltd., Osaka, Japan

[21] Appl. No.: 290,270

[22] Filed: Dec. 27, 1988

[30] Foreign Application Priority Data

Dec. 28, 1987 [JP] Japan ................. 62-335855

[51] Int. Cl.$^5$ ................................ C08K 5/15
[52] U.S. Cl. .................... 524/109; 524/114; 428/378; 428/385; 428/395
[58] Field of Search ............. 524/109, 114; 428/378, 428/385, 395

[56] References Cited

U.S. PATENT DOCUMENTS

| | | | |
|---|---|---|---|
| 4,713,407 | 12/1987 | Bailey et al. | 524/109 |
| 4,726,993 | 2/1988 | Zaopo | 428/378 |
| 4,851,060 | 7/1989 | Wade, Jr. et al. | 428/378 |

*Primary Examiner*—Kriellion S. Morgan
*Attorney, Agent, or Firm*—Birch, Stewart, Kolasch & Birch

[57] ABSTRACT

An electric wire comprising a conductive wire in which the surface thereof is covered with a covering material having improved long-term thermal stability and comprising a polymer comprised of an aromatic polyester as a main skeleton and a compound represented by the following general formula (A) incorporated therein in an amount of 0.1 to 20 parts by weight based on 100 parts by weight of said polymer:

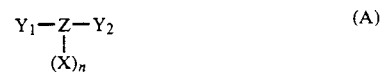

wherein X is a halogen, $Y_1$ and $Y_2$ which may be the same or different are each a functional group containing an epoxy group, Z is a divalent organic group and n is an integer of 1 or more.

16 Claims, No Drawings

POLYESTER COMPOSITION-COVERED WIRE

BACKGROUND OF THE INVENTION

1. Field of the Invention

The present invention relates to a resin composition comprising a polyester and a specified flameretarding agent containing an epoxy and a halogen. The present invention further relates to an electric wire covered with a polyester resin and more particularly to an electric wire covered with a resin composition used as a covering material, which does not suffer any flexibility loss due to heat history, has excellent flame retardancy and comprises a polymer comprised of an aromatic polyester as a main skeleton and a halogen compound containing an epoxy group incorporated therein.

2. Prior Art

Rubber, polyvinyl chloride, polyethylene, polypropylene, nylon, etc. have hitherto been used as a wire covering material. In particular, polyvinyl chloride has extensively been used for this application from the viewpoint of flame retardancy and mechanical strengths. In recent years, with an increase in the severity of the environment under which the above-described covering materials are used, requirements for the properties of the covering material including not only excellent thermal resistance and electrical characteristics but also flame retardancy and an excellent thin-wall forming property necessary for realizing space saving have been increased.

Although crosslinked polyethylene and fluororesin can meet the above-described requirements, they are unsatisfactory in that the former is poor in the thin-wall forming property and the fluororesin is expensive.

Attention has been paid to polyethylene terephthalate and polybutylene terephthalate because they are excellent in the thin-wall forming property as well as in the mechanical strengths (flexibility, abrasion resistance, etc.), thermal resistance, and electrical characteristics. However, these terephthalates are insufficient in the flame retardancy. Further, since they are crystalline resins, the heat history including heating treatment after covering a wire and heating during the use of the covered wire bring about a remarkable lowering in the flexibility thereof. This in turn brings about a lowering in the mechanical strengths such as impact resistance. For this reason, the terephthalates use in the vicinity of heat sources and in environments having a danger of heat buildup should be avoided, which more or less impose restrictions on the use of these materials.

In general, various flame retardant compositions prepared by incorporating various halogen-containing flame retardants in an aromatic polyester have hitherto been proposed. However, in the case in which such is used as a wire covering material, as in the present invention, it is very difficult to simultaneously satisfy various characteristics such as flame retardancy, frictional and abrasion resistance, and flexibility (flexing property and high percentage elongation), and to maintain, without causing any flexibility loss due to heat history even when exposed to a heating atmosphere for a long period of time, characteristics of initial high percentage elongation and flexing property.

SUMMARY OF THE INVENTION

In view of the above-described problems, the present inventors have made extensive and intensive studies with a view to developing an electric wire wherein the covering material does not suffer any flexibility loss due to thermal history and is flame-retardant and excellent in the mechanical and electrical characteristics. As a result of these studies, the present inventors have found that an electric wire comprising a conductive wire in which the surface thereof is covered with a polyester resin composition prepared by adding a particular halogen-containing compound to an aromatic polyester polymer or reacting the particular halogen-containing compound with the aromatic polyester polymer, can satisfy the above-described property requirements. This has led to the completion of the present invention.

The invention provides a coating composition for electric wire, which comprises a mixture containing 100 parts by weight of a polymer comprising mainly of an aromatic polyester and 0.1 to 20 parts by weight of a compound (A) having the below given formula:

(A)

in which X is a halogen, Y1 and Y2 are each are a group having an epoxy, Z is a divalent organic group and n is an integer of 1 or more.

It is preferred that the compound (A) is a halogenated diglycidyl compound, a bisepoxy compound or a polymer thereof having a polymerization degree of 2 to 10. In formula (A), Z is phenylene or cyclohexylene.

The invention also provides an electric wire coated thereon with the composition as defined above.

Accordingly, the present invention provides an electric wire comprising a conductive wire in which the surface thereof, is covered with a covering material having improved long-term thermal stability and is comprised of a polymer composed of an aromatic polyester as a main skeleton and a compound represented by the following general formula (A) incorporated therein in an amount of 0.1 to 20 parts by weight based on 100 parts by weight of said polymer:

(A)

wherein X is a halogen, $Y_1$ and $Y_2$ which may be the same or different are each a functional group containing an epoxy group, Z is a divalent organic group and n is an integer of 1 or more.

There are several conventional compositions comprising an aromatic polyester and a halogen compound containing an epoxy group incorporated therein. However, most of these compositions are intended for use in injection molded articles, and it is quite unknown that these compositions can not only cover in which the covering is of a small wall thickness, an electric wire as in the present invention, particularly as a covering material of a low-tension electric transmission line but also satisfy various characteristics requirements of the wire covering material, particularly that the addition of a bisepoxy compound prevents flexibility loss due to heat history and provides an electric wire covered with a covering material having excellent stability with respect to the use in a heating atmosphere for a long period of time and suitable for these types of applications.

Although there is no particular limitation with respect to the electric wire used in the present invention, a stranded wire is used from the viewpoint of flexibility and reliability. The stranded wire is preferably a compact-stranded wire which enables not only a thin-wall coating because the surface of the conductor is smoothened through the step of compression in the production of the wire but also space saving because of a narrowed gap between the stranded wires. A round compact-stranded wire is most preferable from the viewpoint of precise control of the wall thickness during coating.

The material for the conductor is aluminum, copper, tin-plated copper, aluminum alloy, or the like. Although the material is properly selected according to an intended application, it is preferably copper.

Although the thickness of the covering insulator for the conductor is restricted by, e.g., processability and covering characteristics of the covering material, it is preferred that the thickness be as small as possible. When the outer diameter of the conductor is 3.7 mm or less, the lower limit of the thickness of the conventional covering material is 0.9 to 0.6 mm from the viewpoint of both the electrical and mechanical properties. By contrast, the covering material of the present invention enables the thickness to be reduced to 0.4 mm or less and even reduced to 0.3 mm or less.

The polyester resin composition used as a covering material for the electric wire of the present invention will now be described in detail.

At the outset, the polymer comprising an aromatic polyester copolymer as a main skeleton and constituting a base substance of the covering material of the electric wire of the present invention will be described. Representative examples of the polymer include polyalkylene terephthalates wherein the alkylene group has 2 to 6 carbon atoms. If necessary, a polyalkylene terephthalate (number of carbon atoms of the alkylene group: 2-6) part of which has been modified with various comonomers may be used.

With respect to the components thereof, the carboxylic acid component is composed mainly of an aromatic dicarboxylic acid or an ester forming derivative thereof. Representative examples of the carboxylic acid component include terephthalic acid and its derivatives. Besides these, other dicarboxylic acids such as isophthalic acid and naphthalenedicarboxylic acid and their derivatives, fatty acids such as adipic acid, sebacic acid, trimellitic acid, and succinic acid and ester forming derivatives thereof, and aromatic hydroxy carboxylic acids such as hydroxybenzoic acid and hydroxynaphthoic acid and ester forming derivatives thereof may be optionally used as an auxiliary.

The diol component constituting the polyester polymer is composed mainly of an aliphatic diol or an ester forming derivative thereof. A representative substance of the diol component is a low molecular weight glycol having 2 to 6 carbon atoms, and examples thereof include diols such as ethylene glycol, 1,4-butylene glycol, 1,3-propanediol, 1,4-butenediol, 1,6-hexanediol, and 1,8-octanediol. These low molecular weight glycols may be used in combination with high molecular weight glycols such as polyalkylene oxide glycols, e.g., polyethylene oxide glycol and polybutylene oxide glycol. A combined use of the above-described high molecular weight glycols is very useful for imparting flexibility through an improvement in the elongation of the aromatic polyester constituting the wire covering material of the present invention. Further, aromatic alcohols such as bisphenol A, 4,4'-dihydroxybiphenyl, and phenyl 1,4-dihydroxyphosphinate, adducts of an alcohol with an alkylene oxide such as an adduct of bisphenol A with 2 mol of ethylene oxide and an adduct of bisphenol A with 2 mol of propylene oxide, and polyhydroxy compounds such as glycerin and pentaerythritol or ester forming derivatives thereof may also be used as an auxiliary of the diol component.

The polymer comprising an aromatic polyester as the main skeleton can be prepared by polymerization through conventional processes such as solution polymerization, interfacial polymerization, and solid phase polymerization and has an intrinsic viscosity of about 0.5 to 3.0.

The material used in the covering of the electric wire of the present invention is characterized in that a particular amount of a halogen compound containing an epoxy group is incorporated in or reacted with the above-described polymer comprising an aromatic polyester as the main skeleton.

The epoxy-containing halogen compound used in the present invention is represented by the following general formula (A):

(A)

wherein X is a halogen, $Y_1$ and $Y_2$ which may be the same or different are each a functional group containing an epoxy group, Z is a divalent organic group and n is an integer of 1 or more.

In the formula (A), it is preferred that $Y_1$ and $Y_2$ each contain a glycidyl group represented by the following formula (1):

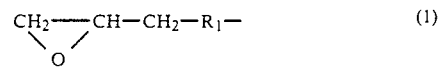

(1)

wherein $R_1$ is a group selected from among —O—,

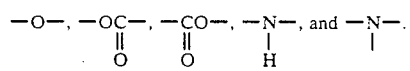

Further, in the formula (A), examples of

include groups represented by the following formulae:

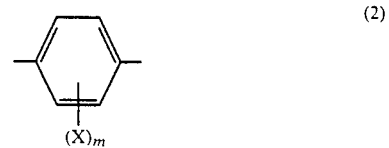

(2)

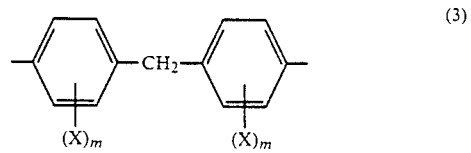

(3)

-continued

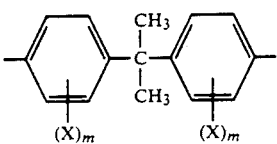 (4)

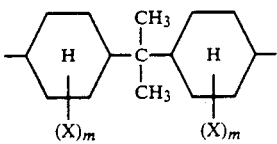 (5)

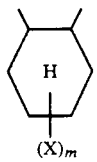 (6)

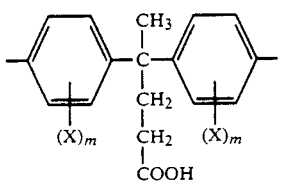 (7)

and

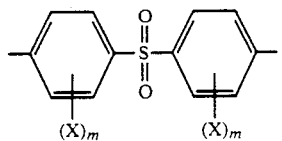 (8)

wherein m is an integer of 1 to 4. It is preferred that the compound represented by the general formula (A) contain at least 4 halogen atoms per molecule.

Even when these bisepoxy compounds are dimeric to decameric, these polymers can be used as the epoxy group-containing halogen compound for the wire covering material of the present invention as long as an epoxy group is present at both ends of the polymers.

When the average degree of polymerization of the bisepoxide exceeds 10, the reactivity of the epoxy group is lowered, which renders such a bisepoxide unsuitable for attaining the object of the present invention.

Among the groups represented by the formulae (2) to (8), the groups represented by the formulae (2), (3), (4), and (8) are preferable in the present invention.

When bromine is used as the halogen, examples of the group represented by the general formula (2) include diglycidyl tetrabromoterephthalate, tetrabromohydroquinone diglycidyl ether, and tetrabromo(glycidyl p-glycidyloxybenzoate), examples of the group represented by the general formula (3) include tetrabromobisphenol F diglycidyl ether, examples of the group represented by the formula (4) include tetrabromobisphenol A diglycidyl ether, and examples of the group represented by the general formula (8) include tetrabromobisphenol sulfone diglycidyl ether.

These halides are incorporated in such amounts that the halogen content of the formed resin composition is 0.5 to 30% by weight, preferably 2 to 20% by weight. When the halide content is less than 0.5% by weight, no sufficient flame retardancy can be attained, while when it exceeds 30% by weight, the mechanical properties are unfavorably lowered.

These halides may be added when preparing the above-described aromatic polyester, or alternatively they may be added or reacted through addition and mixing during preparation of pellets.

Various catalysts may be used for the purpose of improving the reactivity of the epoxy group.

The epoxy-containing halogen compound brings about such a secondary effect that when it is added to a known polyester base material and melt-kneaded therewith, the carboxyl group of the polymer is reacted with the epoxy group of the halide to incorporate the halogen compound into the polymer, thereby preventing the oozing out of the flame retardant, so that no blocking between adjacent wires occurs in preparing a covered wire.

If necessary, stabilizers such as antioxidants and ultraviolet absorbers, antistatic agents, flame retardants, flame retardant aids, colorants such as dyes and pigments, lubricants and lubricating agents for improving flowability and releasability, crystallization promoters (nucleating agents), inorganic materials, etc., may be properly incorporated in the wire covering material of the present invention for the purpose of further improving the performance thereof.

Hindered phenol, amine and phosphorus compounds, etc., may be used as the stabilizer.

Examples of the hindered phenol include 2,2'-methylenebis(4-methyl-6-tert-butylphenol), hexamethylene glycol bis(3,5-di-tert-butyl-4-hydroxyhydrocinnamate), tetrakis[methylene(3,5-di-tert-butyl-4-hydroxyhydrocinnamate)]methane, triethylene glycol bis-3-(3-tertbutyl-4-hydroxy-5-methylphenyl)proponate, 1,3,5-trimethyl-2,4,6-tris(3,5-di-tert-butyl-4-hydroxybenzyl)-benzene, n-octadecyl 3-(4'-hydroxy-3',5'-di-tertbutylphenyl)propionate, 4,4'-methylenebis(2,6-di-tertbutylphenol), 4,4'-butylidenebis(6-tert-butyl-3-methylphenol), 2,2'-thiodiethyl bis[3-(3,5-di-tertbutyl-4-hydroxyphenol)propionate], distearyl 3,5-ditert-butyl-4-hydroxybenzylphosphonate, and 2-tertbutyl-6-(3-tert-butyl-5-methyl-2-hydroxybenzyl)-4-methylphenyl acrylate, and at least one of these may be used. Among these, hexamethylene glycol bis(3,5-di-tert-butyl-4-hydroxyhydrocinnamate), tetrakis[methylene(3,5-di-tert-butyl-4-hydroxyhydrocinnamate)]methane, and triethylene glycol bis-3-(3-tert-butyl-4-hydroxy-5-methylphenyl)propionate are particularly preferable substances.

Examples of the amine compound include N-phenyl-N'-isopropyl-p-phenylenediamine, N'N'-diphenyl-p-phenylenediamine, 4,4'-bis(4-α,α-dimethylbenzyl)-diphenylamine, a product of a condensation reaction of diphenylamine with acetone, N-phenylnaphthylamine, and N,N'-β-naphthylphenylenediamine.

Examples of the phosphorus compound include a phosphonite compound represented by the following general formula (9):

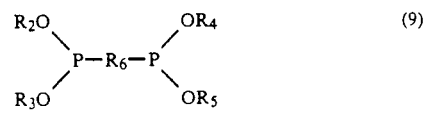 (9)

In the formula, $R_2$, $R_3$, $R_4$, and $R_5$ which may be the same or different are each an alkyl group having 1 to 25 carbon atoms, a substituted alkyl group, an aryl group, or a substituted aryl group. Examples of the group include methyl, ethyl, butyl, octyl, decyl, lauryl, tridecyl, stearyl, phenyl, and alkyl- and/or alkoxy-substituted phenyl groups. $R_6$ is an alkylene group having 4 to 33 carbon atoms, a substituted alkylene group, an arylene group or a substituted arylene group, and examples thereof include butylene, octylene, phenylene naphthylene, and diphenylene groups and a group represented by the following formula:

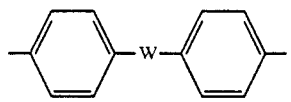

wherein W is an oxy, sulfonyl, carbonyl, methylene, ethylidene, butylidene, isopropylene, or diazo group. A particularly preferred phosphonite compound is tetrakis(2,4-di-tert-butylphenyl) 4,4'-diphenylenephosphonite.

The amount of addition of the phosphorus compound is 0.01 to 5% by weight, preferably 0.1 to 3% by weight based on the total amount of the composition.

Examples of the flame retardant aid include antimony compounds such as antimony trioxide and antimony halide, metallic compounds containing zinc and dismuth, magnesium hydroxide, and clayey silicates such as asbestos.

Examples of the inorganic material include ordinary inorganic fibers such as glass fibers, ceramic fibers, boron fibers, potassium titanate fibers, and asbestos, particulate materials such as calcium carbonate, highly dispersible silicate, alumina, aluminum hydroxide, talc, clay, mica, glass flake, glass powder, glass bead, quartz powder, quartz sand, wollastonite, carbon black, barium sulfate, plaster of paris, silicon carbide, alumina, boron nitrite, and silicon nitrite, flaky inorganic compounds, and whisker.

These inorganic fillers may be used alone or in combination of two or more.

At least one organic polymeric material can be used as an auxiliary for the purpose of improving drape in melt extrusion lubricity, and flexibility. Examples of the organic polymeric material include polyesters having other skeletons, polyamides, carboxylic acid-modified olefins and their copolymers, polyolefins such as polyethylene, polypropylene, and polybutene, polyacrylates, modified polyolefins such as ABS, engineering plastics such as polycarbonates, polyphenylene oxides, polyphenylene sulfides, and fluororesins, and rubber-like elastic polymers such as polyurethane, butyl rubber, ethylene-propylene rubber, and various elastomers.

The electric wire of the present invention is prepared by known processes. In general, a travelling conductor is covered with a covering material by melt extrusion. In this case, there are two methods for covering the wire with the covering material, i.e., a method in which the direction of travel of the conductor is even with the direction of extrusion and a method in which a cross head having a constant angle is used. The electric wire of the present invention can be prepared by either method.

The extruder is preferably a screw extruder because the flow rate of the covering material can be easily controlled thereby.

The unevenness of the thickness of the covering material is detected by known methods with X ray, ultrasonic wave, etc.

The eccentricity due to an uneven thickness is expressed by concentricity $e_c$. A larger value of $e_c$ represents better results. The $e_c$ value is preferably 65% or more, more preferably 70% or more.

$$e_c = \frac{e_{min}}{e_{max}} \times 100$$

wherein
$e_{min}$: minimum thickness of covered section
$e_{max}$: maximum thickness of covered section The unevenness of the thickness can be regulated by a method which comprises detection the unevenness with an uneven thickness detector and automatically or manually adjusting the clearance between the die and the detector at the central portion of a screw extruder and a method in which the flow rate of the covering material is controlled together with pressure and temperature.

The use of a concentric head is also effective in reducing the unevenness of the thickness.

In preparing the electric wire of the present invention, if necessary, the covering material may be passed through a heating zone after application and shaping of the covering material for the purpose of further increasing the mechanical strengths. The temperature of the heating zone is below the melting point and above the glass transition temperature of the covering material.

EFFECTS OF THE INVENTION

The halogen-containing resin composition of the present invention exhibits a remarkable improvement in preventing the lowering in the physical properties attributed to heat history over that of the conventional polyester covering material, which brings about the following excellent effects.

(1) The covering material is excellent in the flame retardancy and less susceptible to the lowering in the physical properties attributed to heat history, which renders the covering material suitable for use in electric wires used in the vicinity of heat sources, engines of transports, heat buildup parts of electric appliances.

(2) It is possible to reduce the thickness of the covering material material impairing the mechanical and electrical characteristics and also to attain excellent flexing property, so that a remarkable increase can be attained with respect to effective utilization of a limited space. This renders the covering material useful for wire applications where information is highly integrated and there is a limitation of the space capacity, e.g., transports such as space rockets, airplanes, and automobiles, electric appliances, computers, and information-related devices.

EXAMPLES

The present invention will now be described with reference to the following Examples, though the present invention is not limited to these Examples only.

EXAMPLE 1

100 parts by weight of polybutylene terephthalate (PBT) and 8 parts by weight of tetrabromobisphenol A diglycidyl ether were mixed in powdery form and then homogeneously mixed in the presence of a catalyst by making use of an ordinary extruder to prepare pellets. A specimen was prepared from the resultant pellets by using an injection molding machine according to an ordinary method and subjected to evaluation of the physical properties.

The individual physical properties were measured by the following methods.

The tensile strength and percentage elongation (%) were measured according to ASTM D 638.

The dielectric breakdown was measured by the short time method according to ASTM D 149.

The oxygen index was measured according to JIS K 7201.

The surface configuration was evaluated as X when abnormal phenomena such as bleeding or blistering were observed on the surface after the specimen was allowed to stand at 120° C. for 72 hr and evaluated as ◯ when no abnormal phenomenon was observed.

A specimen for the tensile test was stored in a thermostatic chamber of 120° C., and the percentage elongation and retention of elongation were measured 500 hr after the initiation of the storage in the same manner as that described above.

Further, an electric wire prepared by coating a stranded copper wire having a diameter of 1 mm with a resin so as to have a coating thickness of 0.2 mm was evaluated according to the abrasion resistance test prescribed in JIS C 3406.

The evaluation was conducted based on electric wires prepared by covering stranded copper wires each having a diameter of 1 mm with polyvinyl chloride (PVC) so as to have a covering thicknesses of 0.5 mm and 1.0 mm, respectively (the former and the latter are hereinafter referred to as "reference wire A" and "reference wire B", respectively). The abrasion resistance of the wire was evaluated as X when the minimum abrasion resistance (mm) was smaller than that of reference wire A, as Δ when the minimum abrasion resistance (mm) is between those of referenced wires A and B, and as ◯ when the minimum abrasion resistance (mm) is larger than that of reference wire B.

The results are shown in Table 1.

EXAMPLE 2

The evaluation of the specimen was conducted in the same manner as that of Example 1, except that 8 parts by weight of diglycidyl tetrabromobenzoate was used as the halogen compound.

The results are shown in Table 1.

EXAMPLE 3

The evaluation of the specimen was conducted in the same manner as that of Example 1, except that 8 parts by weight of a condensate (number-average molecular weight: 1560) of tetrabromobisphenol sulfone diglycidyl ether was used as the halogen compound.

The results are shown in Table 1.

COMPARATIVE EXAMPLE 1

The evaluation of the specimen was conducted in the same manner as that of Example 1, except that 8 parts by weight of decabromodiphenyl ether was used as the halogen compound.

The results are shown in Table 1.

COMPARATIVE EXAMPLE 2

The evaluation of the specimen was conducted in the same manner as that of Example 1, except that no flame retardant was added to polyvinyl chloride (PVC). The specimen was deformed when heated at 120° C., so that the physical properties could not be measured.

TABLE 1

|  | Ex. 1 | Ex. 2 | Ex. 3 | Comp. Ex. 1 | Comp. Ex. 2 |
|---|---|---|---|---|---|
| base resin (pts. wt.) |  | PBT (100) |  | PBT (100) | PVC (100) |
| tetrabromobisphenol A diglycidyl ether (pts. wt.) | 8 | — | — | — | — |
| diglycidyl tetrabromobenzoate (pts. wt.) | — | 8 | — | — | — |
| condensate of tetrabromobisphenol sulfone diglycidyl ether (pts. wt.) | — | — | 8 | — | — |
| decabromodiphenyl ether (pts. wt.) | — | — | — | 8 | — |
| tensile strength (kg/cm$^2$) | 570 | 572 | 567 | 542 | 220 |
| tensile elongation (%) | 300< | 300< | 300< | 265 | 250 |
| dielectric breakdown | 17 | 17 | 17 | 16 | 29 |
| oxygen index | 27 | 27 | 27 | 28 | 27 |
| surface configuration | ◯ | ◯ | ◯ | X | — |
| 500 hr after heat treatment tensile strength (kg/cm$^2$) | 583 | 585 | 578 | 545 | — |
| 500 hr after heat treatment elongation (%) | 222 | 235 | 210 | 74 | — |
| abrasion resistance | ◯ | ◯ | ◯ | Δ | X |

What is claimed is:

1. An electric wire having coated thereon a coating composition which comprises a mixture containing 100 parts by weight of a polymer comprising an aromatic polyester and 0.1 to 20 parts by weight of a compound (A) having the formula:

$$Y_1-Z-Y_2 \atop (X)_n \quad (A)$$

in which X is a halogen, $Y_1$ and $Y_2$ are each a glycidyl group represented by formula (1):

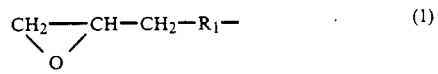

wherein $R_1$ is a group represented by

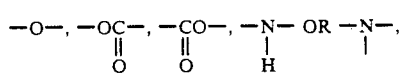

Z is a divalent group and n is an integer of from 1 or more.

2. An electric wire having coated thereon a coating composition which comprises a reaction product produced by reacting 100 parts by weight of a polymer comprising an aromatic polyester with 0.1 to 20 parts by weight of a compound (A) having the formula:

$$Y_1-Z-Y_2 \quad (A)$$
$$\phantom{Y_1-}|$$
$$\phantom{Y_1-}(X)_n$$

in which X is a halogen, $Y_1$ and $Y_2$ are each a glycidyl group represented by formula (1):

$$\underset{\underset{O}{\diagdown\diagup}}{CH_2-\!\!-\!\!-CH}-CH_2-R_1- \quad (1)$$

wherein $R_1$ is a group represented by $$-O-,\ -\underset{\underset{O}{\|}}{OC}-,\ -\underset{\underset{O}{\|}}{CO}-,\ -\underset{\underset{H}{|}}{N}-\ \text{OR}\ -\underset{|}{N}-,$$

Z is a divalent group and n is an integer of from 1 or more.

3. The electric wire according to claim 1, wherein the compound (A) is a halogenated diglycidyl compound.

4. The electric wire according to claim 1, wherein the compound (A) has 4 or more halogen atoms.

5. The electric wire according to claim 1, wherein Z of the compound (A) contains phenylene or cyclohexylene.

6. The electric wire according to claim 1, wherein the polymer further comprises a polyalkylene terephthalate.

7. The electric wire according to claim 2, wherein the compound (A) is a halogenated diglycidyl compound.

8. The electric wire according to claim 2, wherein the compound (A) has 4 or more halogen atoms.

9. The electric wire according to claim 2, wherein Z of the compound (A) contains phenylene or cyclohexylene.

10. The electric wire according to claim 2, wherein the polymer further comprises a polyalkylene terephthalate.

11. An electric wire having coated thereon a coating composition consisting essentially of 100 parts by weight of a polymer comprising an aromatic polyester and 0.1 to 20 parts by weight of the polymer of the compound (A) as defined in claim 9, said polymer having a polymerization degree of 2 to 10.

12. An electric wire having coated thereon a coating composition consisting essentially of a reaction product produced by reacting 100 parts by weight of a polymer comprising an aromatic polyester with 0.1 to 20 parts by weight of the compound (A) as defined in claim 7, said polymer having a polymerization degree of 2 to 10.

13. The electric wire according to claim 1, wherein $$-Z-$$
$$\ |$$
$$(X)_n$$

of compound (A) is a group represented by formula:

(2) [phenylene with $(X)_m$]

(3) [two phenyl rings bridged by $-CH_2-$, each with $(X)_m$]

(4) [two phenyl rings bridged by $-C(CH_3)_2-$, each with $(X)_m$]

(5) [two cyclohexyl rings (with H) bridged by $-C(CH_3)_2-$, each with $(X)_m$]

(6) [cyclohexyl ring with H and $(X)_m$]

(7) [two phenyl rings bridged by $-C(CH_3)(CH_2CH_2COOH)-$, each with $(X)_m$]

or (8) [two phenyl rings bridged by $-S(=O)_2-$, each with $(X)_m$]

wherein m is an integer of 1 to 4.

14. The electric wire according to claim 2, wherein $$-Z-$$
$$\ |$$
$$(X)_n$$

of compound (A) is a group represented by formula:

(2) [phenylene with $(X)_m$]

(3) [two phenyl rings bridged by $-CH_2-$, each with $(X)_m$]

-continued
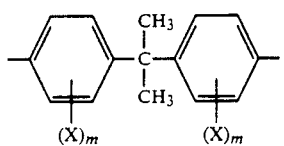  (4)
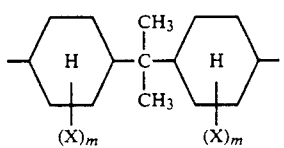  (5)
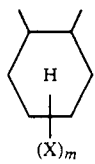  (6)
-continued
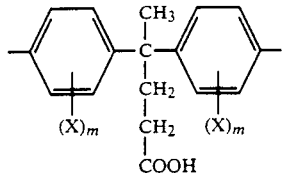  (7)
or
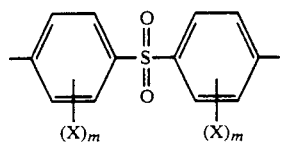  (8)
wherein m is an integer of 1 to 4.
15. The electric wire according to claim 13, in which n is an integer of from 1 to 80, and wherein said polymer has a polymerization degree of 2 to 10.
16. The electric wire according to claim 14, in which n is an integer of from 1 to 80, and wherein said polymer has a polymerization degree of 2 to 10.
* * * * *